(12) United States Patent
Tan et al.

(10) Patent No.: US 7,395,506 B2
(45) Date of Patent: Jul. 1, 2008

(54) SPY-RESISTANT KEYBOARD

(75) Inventors: Desney S Tan, Pittsburgh, PA (US);
Pedram Keyani, San Jose, CA (US);
Mary P Czerwinski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 10/870,510

(22) Filed: Jun. 17, 2004

(65) Prior Publication Data

US 2005/0251451 A1 Nov. 10, 2005

Related U.S. Application Data

(63) Continuation of application No. 10/843,268, filed on May 10, 2004, now Pat. No. 7,296,233.

(51) Int. Cl.
*G06F 3/00* (2006.01)

(52) U.S. Cl. .......................... 715/741; 715/773; 726/26; 705/18

(58) Field of Classification Search .................. None
See application file for complete search history.

(56) References Cited

U.S. PATENT DOCUMENTS

| | | | |
|---|---|---|---|
| 5,428,349 A * | 6/1995 | Baker | 340/5.54 |
| 5,559,961 A | 9/1996 | Blonder | |
| 6,434,702 B1 * | 8/2002 | Maddalozzo et al. | 726/17 |
| 6,571,336 B1 * | 5/2003 | Smith, Jr. | 713/184 |
| 7,124,433 B2 * | 10/2006 | Little | 726/2 |
| 7,171,693 B2 * | 1/2007 | Tucker et al. | 726/26 |
| 2002/0196274 A1 * | 12/2002 | Comfort et al. | 345/741 |
| 2006/0053301 A1 * | 3/2006 | Shin | 713/183 |

OTHER PUBLICATIONS

Adams, A., et al., "Making Passwords Secure and Usable," in H. Thimbleby, et al. (eds.), *Proceedings of Conf. on Human Computer Interacation: People & Computers XII*, Bristol, U.K., Aug. 12-15, 1997, pp. 1-19.

Brostoff, S., and M.A. Sasse, "Are Passfaces More Than Passwords? A Field Trial Investigation," in S. McDonald, et al. (eds.), *Proceedings of Conference on Human Computer Interaction: People and Computers XIV—Usability or Else!*, Sunderland, UK, Sep. 5-8, 2000, pp. 405-424.

Halevi, S., and H. Krawczyk, "Public-Key Cryptography and Password Protocols," *ACM Transactions on Information and System Security* 2(3):230-268, Aug. 1999.

(Continued)

*Primary Examiner*—Tadesse Hailu
*Assistant Examiner*—Haoshian Shih
(74) *Attorney, Agent, or Firm*—Christensen O'Connor; Johnson Kindness PLLC

(57) ABSTRACT

A method, system and article of manufacture for providing a spy-resistant keyboard. The spy-resistant keyboard provides a user with additional protection against unauthorized observers while the user is interfacing with a system implementing the spy-resistant keyboard. The keyboard may include a number of tiles with a number of user-selectable characters randomly associated with each tile. A spy-resistant keyboard may also include a number of movable tiles with user-selectable characters. Before a user selects a user-selectable associated with one of the tiles, all the user-selectable characters in the tiles are at least blanked to avoid unauthorized viewing of a chosen tile.

11 Claims, 8 Drawing Sheets

OTHER PUBLICATIONS

Haller, N., et al., "A One-Time Password System," memo from *The Internet Society*, 1998, pp. 1-25.

Jain, A., et al., "Biometric Identification," *Communications of the ACM 42*(3):91-98, Feb. 2000.

Jermyn, I., et al., "The Design and Analysis of Graphical Passwords," *Submission to the 8th USENIX Security Symposium*, Mar. 8, 1999, Washington, D.C., pp. 1-20.

Jermyn, I., et al., "The Design and Analysis of Graphical Passwords," *Proceedings of the 8th USENIX Security Symposium*, Aug. 23-26, 1999, Washington, D.C., 14 pages.

National Institute of Standards and Technology, "Password Usage," *Federal Information Processing Standards Publication 112*, May 30, 1985, 27 pages.

Neumann, P.G., "Risks of Passwords," *Communications of the ACM 37*(4):126, Apr. 1994.

Roth, V., et al., "A PIN-Entry Method Resilient Against Shoulder Surfing," *Proceedings of the 11th ACM Conference on Computer and Communications Security 2004*, Washington, D.C., Oct. 25-29, 2004, pp. 236-245.

Sasse, M.A., et al., "Transforming the 'Weakest Link'—a Human/Computer Interaction Approach to Usable and Effective Security," *BT Technology Journal 19*(3):122-131, Jul. 2001.

Tan, D.S., and M. Czerwinski, "Information Voyeurism: Social Impact of Physically Large Displays on Information Privacy," *Proceedings of Conference on Human Factors in Computing Systems*, Fort Lauderdale, Fla., Apr. 5-10, 2003, pp. 748-749.

Zviran, M., and W.J. Haga, "User Authentication by Cognitive Passwords: An Empirical Assessment," *Proceedings of the Fifth Jerusalem Conference on Information Technology*, Jerusalem, Israel, Oct. 22-25, 1990, pp. 137-144.

\* cited by examiner

SPY-RESISTANT KEYBOARD

CROSS-REFERENCE TO RELATED APPLICATION

This application is a continuation of U.S. application Ser. No. 10/843,268, filed May 10, 2004, and claims priority thereof under 35 U.S.C. § 120. The entire contents of application Ser. No. 10/843,268 are hereby incorporated by reference.

FIELD OF THE INVENTION

The present invention generally relates to interfaces for receiving a password, or any other input. More specifically, the present invention generally relates to graphical interfaces for receiving a password, or the like, via a touch screen.

BACKGROUND OF THE INVENTION

One of the most popularly used and simple methods for providing access to computer systems, secure areas, financial transaction systems and others is by password entry through a keyboard or keypad. A visual display unit is often associated with such systems. For example, a standard method for password entry routinely used for various access control situations is the entry of alphanumeric password characters through a standard keyboard or a numeric keypad. Normally, the user's key entry is not revealed on the screen directly. Rather, an asterisk "*", or some other character is displayed in response to each entry of a password character.

The use of touch screens or "soft keyboards" in conjunction with computer system displays has increased significantly. For example, touch screens employing the use of a conventional soft keyboard are commonly used with tablet personal computers, personal digital assistants (PDAs), laptop computers, wireless devices, electronic whiteboards (e.g., Smartboards) and other such devices. Furthermore, conventional soft keyboards are also being used with systems that require the use of physically large display devices, such as a system that employs the use of a large plasma screen or projection monitor. The use of a touch screen employing a soft keyboard often eliminates the need to use inconvenient physical keyboards. At the very least, touch screens employing soft keyboards may be used in an advantageous manner with limited space devices.

A conventional soft keyboard functions like a physical keyboard, except that users touch an on-screen image-map to type input information. FIG. 1 illustrates a display 10 that includes a conventional soft keyboard 20. The display 10 shown in FIG. 1 also includes a password entry region 30 that includes a user input field 40. The display 10 may be used in conjunction with a variety of devices, such as computer systems, secure access systems, financial transaction systems, and others.

As is further illustrated in FIG. 1, the conventional soft keyboard 20 includes various keys that may be used to enter text similar to a traditional keyboard. In the case of the display 10, a user simply touches a desired alphanumeric character represented by one of the keys 50 in order to enter information into the user input field 40. For example, a user may enter a series of alphanumeric characters in the user input field 40, and then press the "enter" key in order to gain permissible access to a system the display 10 is interfaced with.

Whether a password is entered via a conventional hardware keyboard, or a conventional soft keyboard, it is possible that an unauthorized person may observe the sequence of key entries processed through the keyboard and make a quick guess about the content of the entered password. While the frequent change of authorized passwords can prevent this possibility to some extent, an unauthorized person can still exploit access to a system before the password is changed. In addition, in many systems such as automatic teller machines, a user's password or pass code is usually infrequently changed.

Conventional soft keyboards, such as the conventional soft keyboard 20 used in conjunction with the display 10, are even more susceptible to unauthorized viewing by one or more observers than a conventional hardware keyboard. This is because an interface such as a conventional soft keyboard depicted on a display is often intrinsically observable. One or more observers watching a user enter characters via a soft keyboard can easily reconstruct text that has been entered. This is a problem exacerbated by the general operational characteristic of a soft keyboard. In particular, as is known, when a user enters text with a soft keyboard, letters, numbers and/or symbols interfaced with provide a highlighting effect so the user knows a selected key has been properly chosen. For example, depressing a key on a soft keyboard may cause the selected key to momentarily illuminate or highlight so that it is obvious to the user that the key has been selected. Even without this visual feedback, an observer could still watch the physical actions of the user to determine what has been typed. The unauthorized watching of selected keys on a soft keyboard or the like is an activity known as shoulder surfing.

Naturally, a user typing on a conventional soft keyboard may take precautions that make it more difficult for one or more unauthorized observers to obtain an entered password or other such security related text. For example, a user may physically obscure the display so that one or more unauthorized observers cannot see the conventional soft keyboard as alphanumeric data is entered thereby. However, this can be difficult when using displays in places and locations that make blocking inconvenient, or when the display is physically larger than a user's body.

In the case where the display is physically larger than the user's body, it may be impossible to conceal the input of a password or other such security related text from one or more unauthorized observers. Therefore, when a conventional soft keyboard is employed on a display, and the display is so large that it makes it impossible to block others from viewing a user's use of the conventional soft keyboard, any text that is input using the soft keyboard is intrinsically at risk of being compromised.

Alternatively, or in combination with a blocking strategy, a user may attempt to confuse one or more unauthorized observers by quickly adding and deleting characters that are not part of a password or security code being entered via a conventional soft keyboard. However, this technique usually increases the number of mistyped passwords and generally does not add much security against one or more unauthorized observers. Moreover, taking intentional actions to protect one's password is time consuming and therefore generally undesirable.

SUMMARY OF THE INVENTION

An exemplary method formed in accordance with the present invention includes displaying a plurality of user-selectable characters within a plurality of character tiles; causing the plurality of user-selectable characters within the plurality of character tiles to disappear; and causing the plurality blanked character tiles to shift position.

An exemplary system formed in accordance with the present invention includes a display; and a processor for causing a plurality of user-selectable characters within a plurality of character tiles to be displayed on the display, the processor further causing the plurality of user-selectable characters within the plurality of character tiles to disappear, and causing the plurality blanked character tiles to shift position.

Still another exemplary apparatus formed in accordance with the present invention is an article of manufacture for use in programming a processor. The article of manufacture includes at least one computer readable storage device including at least one computer program embedded therein that causes the processor to perform a method according to the present invention, including the above described exemplary method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE EXEMPLARY EMBODIMENTS

Brief Summary

The following description will describe an exemplary system for providing an operating environment for a spy-resistant keyboard that is resistant to unauthorized access to text input using the keyboard. Furthermore, exemplary layouts and operation of exemplary spy-resistant keyboards are described in the following.

Exemplary System

Figure 1:
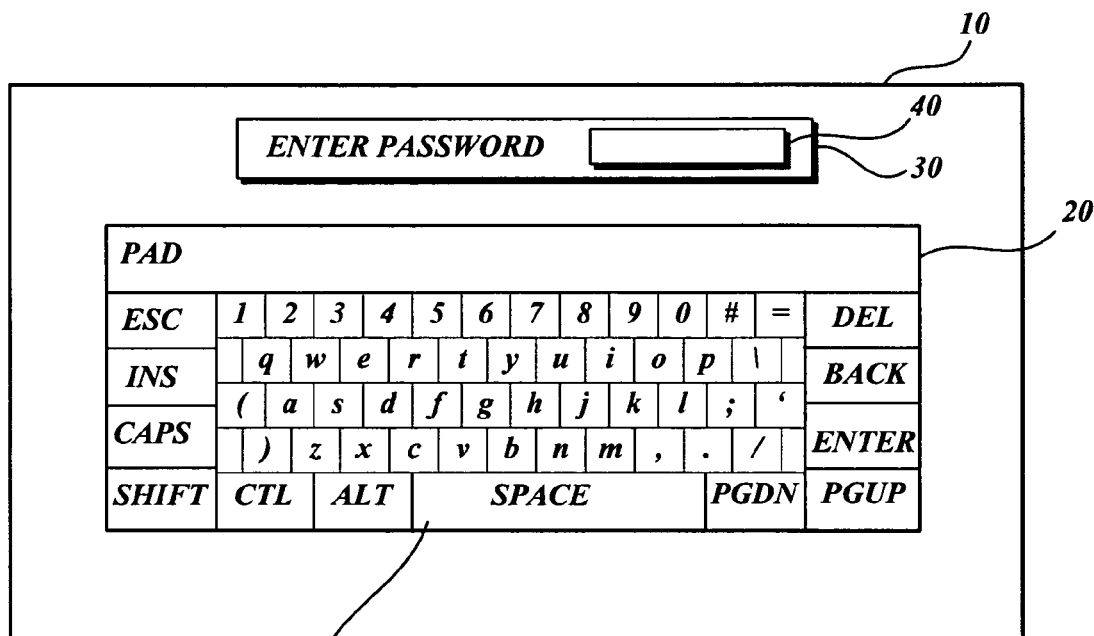
FIG. 1 illustrates a conventional display employing a conventional soft keyboard.
Figure 2:
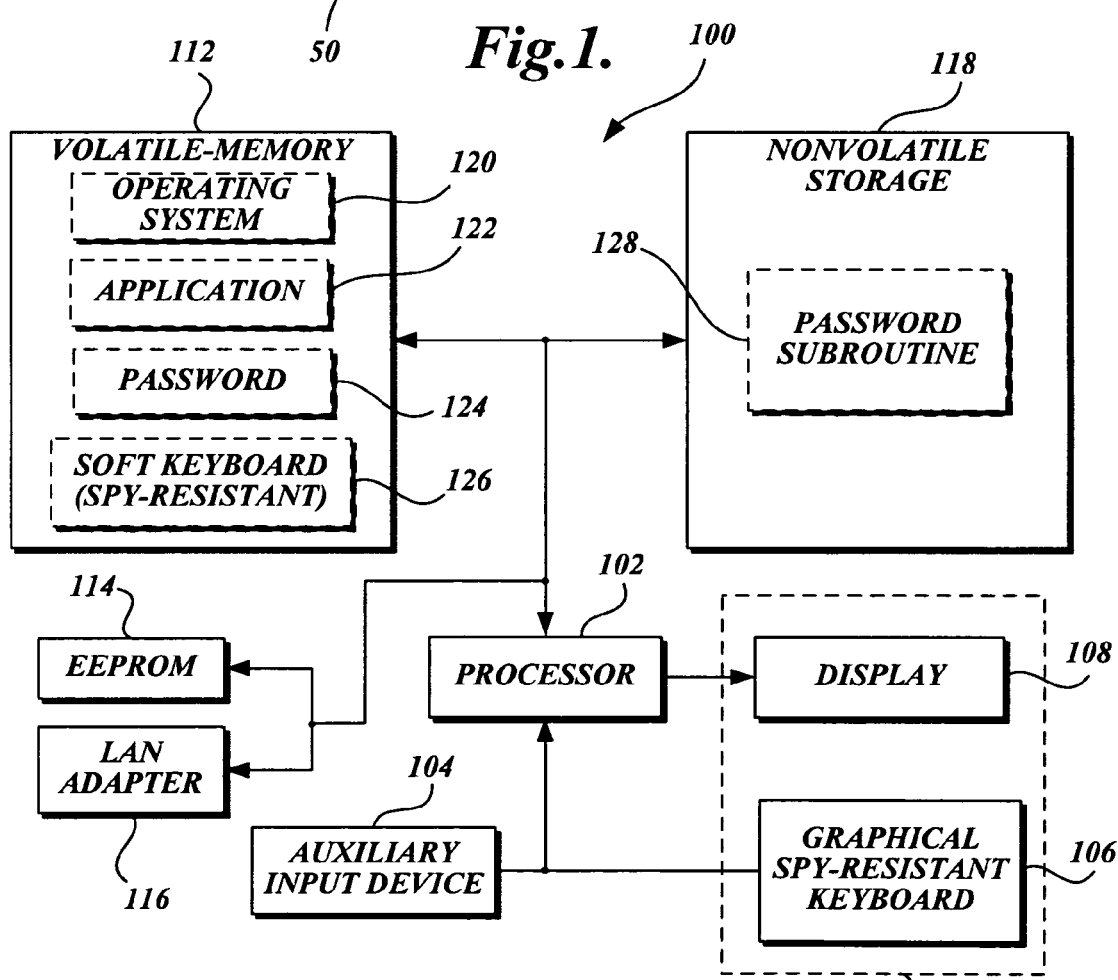
FIG. 2 is a block diagram of a system for providing an operating environment for the various exemplary embodiments of the present invention.

FIG. 2 illustrates a block diagram of a system 100 suitable for providing an exemplary operating environment for an exemplary embodiment of the present invention. While system 100 may be referred to in this description as a computer system, it should be understood that the system 100 may be implemented in various operational devices. For example, the system 100, or a similar system, may be implemented in a personal digital assistant (PDA), a handheld computer, a tablet computer, a wireless device, a conventional computer, a financial system, an information kiosk, or other such system. Therefore, it is to be understood that the system 100 illustrated in FIG. 2 should be viewed as merely illustrative and not limiting of the exemplary embodiments of the present invention described herein. That is, the system 100 should be considered as illustrative of an arrangement with which exemplary embodiments described herein may be used.

Referring to FIG. 2, a processor 102 may receive inputs from an auxiliary input device 104, such as a conventional hardware keyboard, and from a graphical spy-resistant keyboard 106 (and/or a graphical spy-resistant keyboard 700) that may be displayed on a touch enabled liquid crystal display 108, or other displaying technology, within a display screen 110. The system also includes a random-access memory 112, an EPROM 114 and a local area network (LAN) adapter 116. The system 100 additionally includes a non-volatile storage 118, in the form of a hard disk drive or a flash memory, each of which includes a computer readable medium, held within the system 100, which retains recorded data even when electrical power is not supplied to the system 100.

The processor 102 executes instructions of an operating system 120 and an application program 122 stored in the random-access memory 112. Both the operating system 120 and the application program 122 may be stored in the non-volatile storage 118, and/or one or more computer readable medium (not illustrated). Alternatively, either or both the operating system 120 and the application program 122 may be transmitted in the form of electrical signals over a LAN and through the LAN adapter 116, being downloaded for storage and use for retrieval from the non-volatile storage 118.

In accordance with exemplary embodiments of the present invention, one or more password routines 124, which are executed by the processor 102, provide for one or more types of instances in which a password is required for obtaining access to the system 100. Moreover, the random-access memory 112 includes a soft keyboard (spy-resistant keyboard) routine 126 that may be executed in the processor 102, which causes the display screen 110 with the liquid crystal display 108 to display the graphical spy-resistant keyboard 106 and/or the graphical spy-resistant keyboard 700. When the spy-resistant keyboard 106 is displayed on the display screen 110, user inputs through the graphical spy-resistant keyboard 106 or the keyboard 700 are interpreted and processed by the processor 102.

That is, after entry of a password through the graphical spy-resistant keyboard 106 or the keyboard 700, the processor 102 in conjunction with the password routines 124, accesses a password subroutine 128 contained in the non-volatile storage 118. The password subroutine 128 provides one or more actual user passwords, in encrypted form, which the processor 102 along with the password routines 124 may use to compare with a password entered via the graphical spy-resistant keyboard 106 or the keyboard 700. In the case of the keyboard 700, the passwords entered thereby and the actual user passwords would be user selected numeric/symbolic pass codes.

Generally, before the operating system 120 is loaded from the non-volatile storage 118, an initialization program stored in the EPROM 114, and executed within the processor 102, may require entry of a password via the graphical spy-resistant keyboard 106, the keyboard 700 or another auxiliary input device 104. Similarly, the operating system 120 may require the entry of a password before processing an application program 122. As discussed above, previously entered and stored actual passwords, in encrypted form, may be stored in the password subroutine 128. These stored passwords are generally set by the user during a set up process of the operating system 120, during a set up process of an application program 122, and/or when creating a new user account. The graphical spy-resistant keyboard 106 and/or the keyboard 700, according to the exemplary embodiments of the present invention, allow entry of user passwords/pass codes in order to request and gain access to the system 100, which includes the use of operating system 120 and one or more applications 122.

Spy-Resistant Keyboard—First Embodiment

Figure 3:
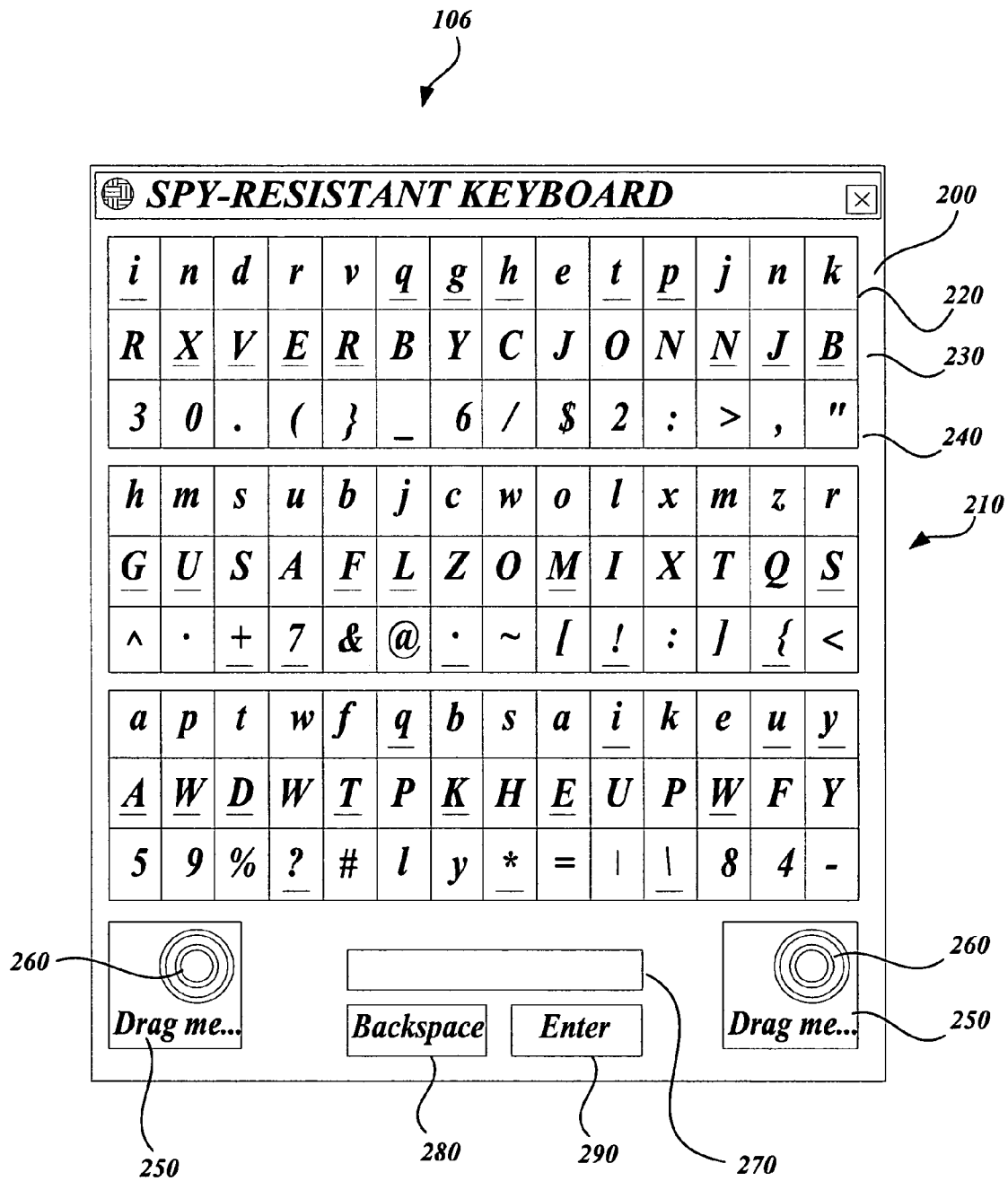
FIG. 3 is a graphical representation of a spy-resistant keyboard according to an exemplary embodiment of the present invention.
Figure 4:
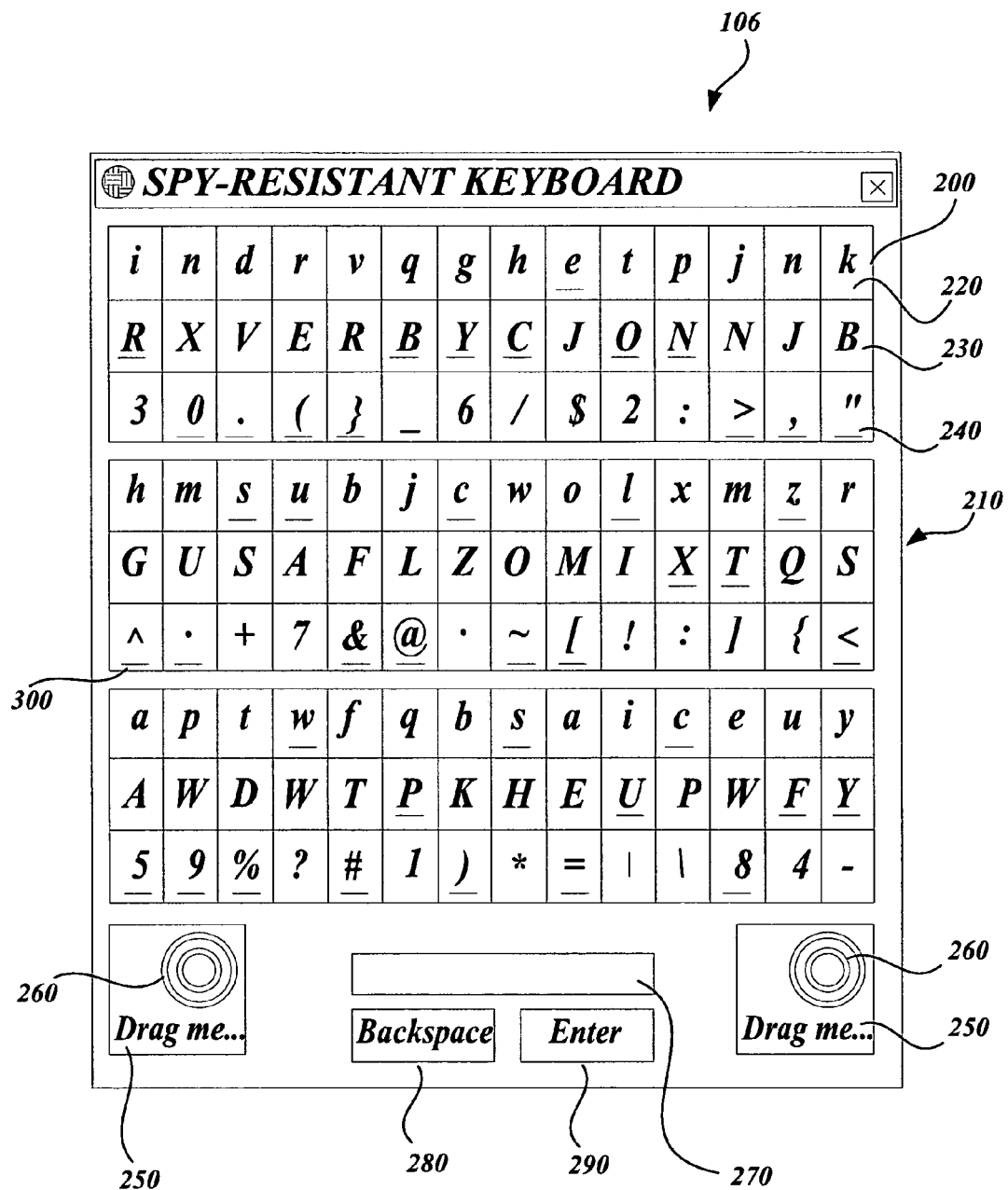
FIG. 4 is a graphical representation of the spy-resistant keyboard of FIG. 3, after having undergone a shifting process.
Figure 5:
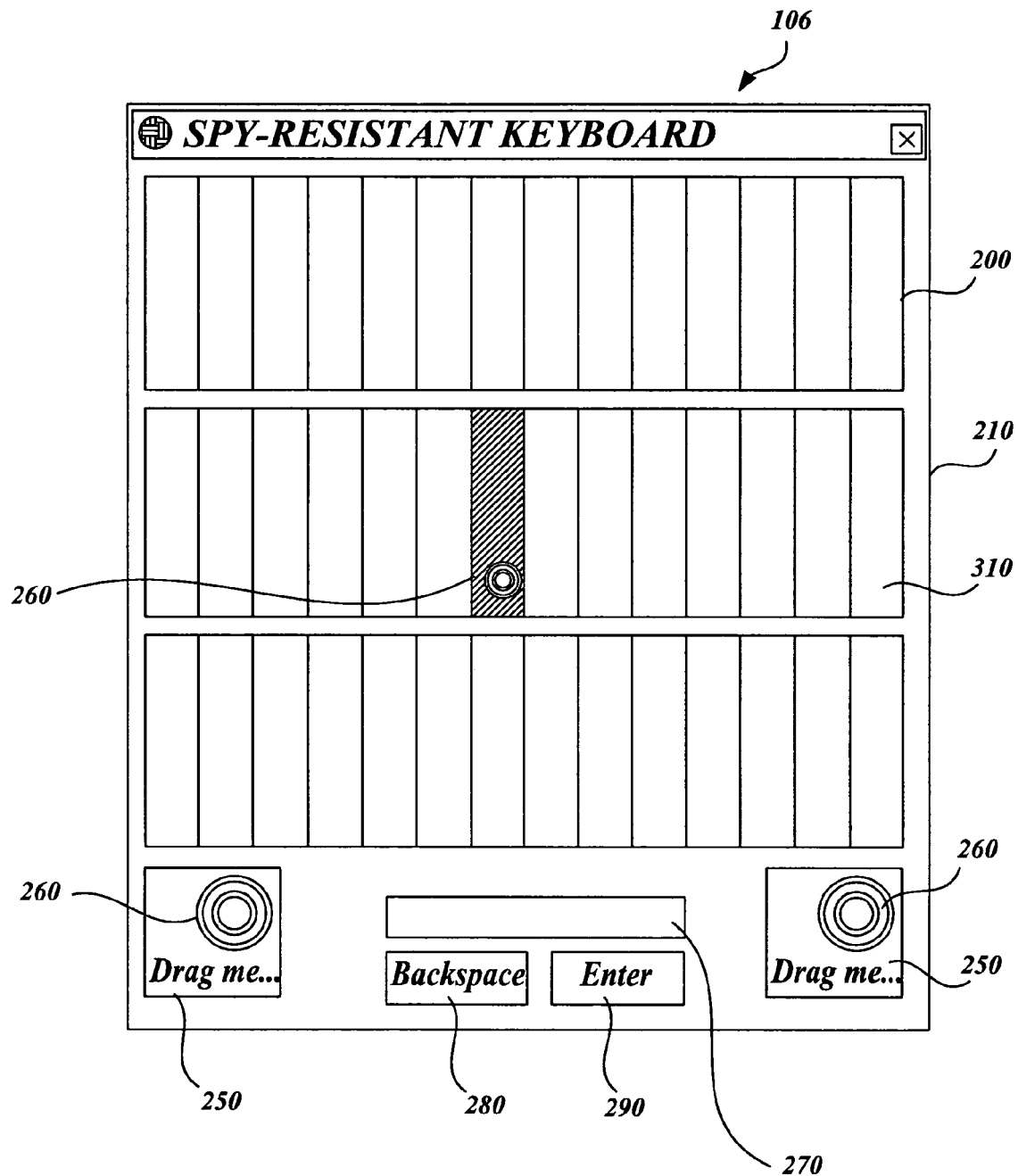
FIG. 5 illustrates the spy-resistant keyboard of FIG. 4 with blank character tiles.

FIG. 3 illustrates the spy-resistant keyboard 106 in accordance with an exemplary embodiment of the present invention. FIG. 4 illustrates the spy-resistant keyboard 106 after undergoing a shifting process (described below), and FIG. 5 illustrates the spy-resistant keyboard 106 after undergoing a blanking process (also described below). Each of the referred to FIGS. 3, 4 and 5 will be discussed in conjunction with various elements illustrated in conjunction with system 100.

Referring to the figures, the spy-resistant keyboard 106 includes a plurality of character tiles 200 displayed within a graphical window 210. In the exemplary embodiment illustrated in FIGS. 3, 4 and 5, there are 42 character tiles 200, where each character tile is randomly assigned a lowercase letter, an uppercase letter, and either a number or a symbol. The randomizing function of the graphical spy-resistant keyboard 106 is handled by the spy-resistant keyboard routine 126.

In accordance with one exemplary embodiment to the present invention, lowercase letters displayed in the character tiles 200 are positioned in a top portion 220 of each of the character tiles 200. A middle portion 230 of the character tiles 200 includes the uppercase letters 230 and a bottom portion 240 includes either a number or a symbol. In the exemplary embodiment shown in the figures, due to the number of character tiles 200, it is possible to repeat various lowercase and uppercase letters, and various numbers and symbols. Which characters are repeated is determined in a random manner. Once again, this randomization functionality is provided by the spy-resistant keyboard routine 126.

The spy-resistant keyboard 106 illustrated in FIGS. 3, 4 and 5 also includes two Interactor tiles 250, which are illustrated in the figures as having the label "drag me . . . " In addition, the Interactor tiles 250 each include a draggable element 260. The spy-resistant keyboard 106 also includes a text field 270, a Backspace key 280, and an Enter key 290. Furthermore, each of the character tiles 200 includes a shiftable underliner 300, which may be shifted by a user of the spy-resistant keyboard 106 via interaction with one of the Interactor tiles 250. This operation will be discussed below.

Regarding the spy-resistant keyboard 106 representations illustrated in FIGS. 4 and 5, FIG. 4 illustrates a rendering of the spy-resistant keyboard 106 with the underliner 300 shifted after a user has interacted with one of the Interactor tiles 250. FIG. 5 illustrates blank character tiles 310. According to an exemplary embodiment of the present invention, and discussed further below, the character tiles 200 are blanked once a user begins the process of dragging the draggable element 260. Similar to the randomization of the character tiles 200, the spy-resistant keyboard routine 126 performs the rendering of the blank character tiles 310.

Use of Spy-Resistant Keyboard—First Embodiment

Figure 6:
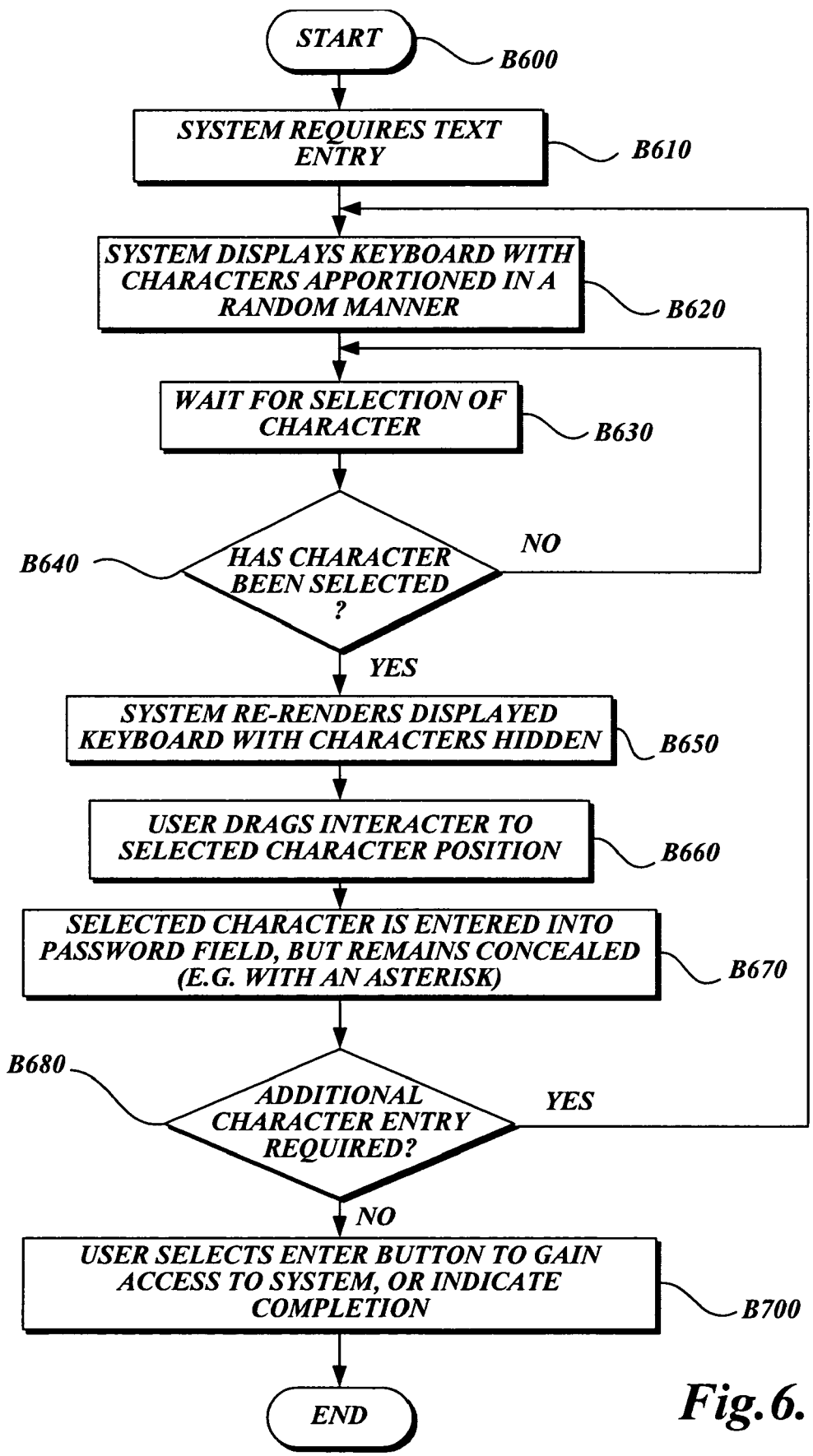
FIG. 6 is a flowchart illustrating a process for entering an alphanumeric password using a spy-resistant keyboard in accordance with an exemplary embodiment of the present invention.

FIG. 6 is a flowchart illustrating a process for entering an alphanumeric password using the spy-resistant keyboard 106 in accordance with an exemplary embodiment of the present invention. Block B600 represents the start of the process illustrated in FIG. 6. As previously discussed, upon initialization of the operating system 120, the system 100 may require entry of a password to gain access to and operate the operating system 120 (B610). If this is the case, the system 100, in conjunction with the operating system 120, will display the spy-resistant keyboard 106 with character tiles 200 that include randomly generated lowercase letters, uppercase letters, and numbers and symbols. In addition, the spy-resistant keyboard 106 will include randomly positioned underliners 300 positioned under respective characters of the character tiles 200. The underliners 300 indicate the letter, number or symbol that will be stored if a character tile 200 is chosen. The foregoing description is summarized in block B620 of FIG. 6.

Once the spy-resistant keyboard 106 is displayed on the display screen 110, the system 100 waits for a user to select a character from one of the character tiles 200 (B630). In order to select a character from one of the character tiles 200, the user simply views the window 210 of the spy-resistant keyboard 106 in order to determine the location of a desired character. Once the character is visually located, for example, the lowercase letter "c" shown in the spy-resistant keyboard 106 of FIG. 3, the user taps one of the Interactor tiles 250 in order to change the underliner 300 such that it underlines the lowercase "c". (See FIG. 4.) Once a user has visually selected a character of the spy-resistant keyboard 106 and has interacted with one of the Interactor tiles 250 to change the position of the underliner 300 such that it is properly positioned under the chosen character, the user may manipulate one of the draggable elements 260 in order to select the chosen character (B640).

In order to actually select the chosen character, the user must drag one of the draggable elements 260 to the character tile 200 in which the chosen character resides. At the moment the user begins to drag the draggable element 260, the system 100, by way of the spy-resistant keyboard routine 126, links all of the character tiles 200 so that the characters within the character tiles 200 are hidden from view (B650; see FIG. 5). As the user drags the draggable element 260 across the window 210 of the spy-resistant keyboard 106, the character tiles 200 remain blank. In order to register the selection of the chosen character in the system 100, the draggable element 260 must be placed in the character tile 200 that contains the chosen character (B660). As is illustrated in FIG. 5, the user has dragged the draggable element 260 to the blank character tile 200 which contains the chosen lowercase "c". Once the draggable element 260 is positioned over the chosen character tile 200, the user drops the draggable element 260 and the selected character is entered into the text field 270 (B670). In one embodiment, the entered character may be hidden by another character or symbol so that an unauthorized observer cannot see the chosen letter, number or symbol. For example, chosen letters, numbers or symbols may be represented in the text field 270 as an asterisk ("*"). If the user forgets which character tile 200 includes the chosen letter, the user may simply drop the draggable element 260 at a location where a character tile 200 is not located and nothing will be entered into the text field 270. If this occurs, a new instantiation of the spy-resistant keyboard 106 is rendered (see block B680). If the user would like to delete a character that has been entered, the user may select the Backspace key 712.

Once a character is entered into the text field 270, the user has the option of entering additional characters using the spy-resistant keyboard 106 (B680). In particular, the user may use the spy-resistant keyboard 106 to enter additional characters, as discussed in relation to Blocks B620-B680. However, if the user has finished entering text in the text field 270, then the user may select the Enter key 290 to gain permissible access to the system 100, assuming correct entry of a password registered in password subroutine 128 stored in the nonvolatile storage 118 (B700).

Spy-Resistant Keyboard—Second Embodiment

Figure 7:
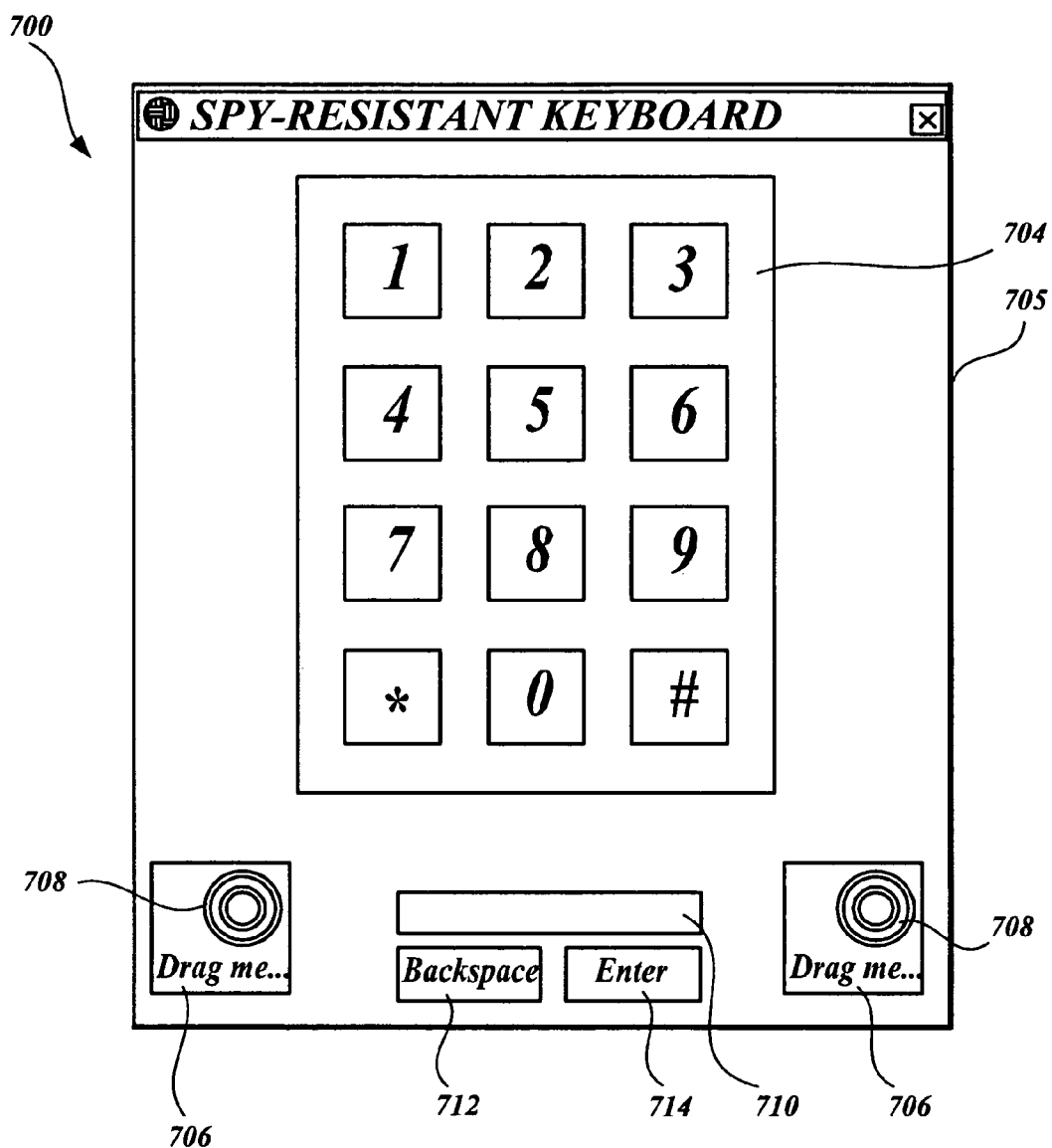
FIG. 7 is a graphical representation of a spy-resistant keyboard according to another exemplary embodiment of the present invention.
Figure 8:
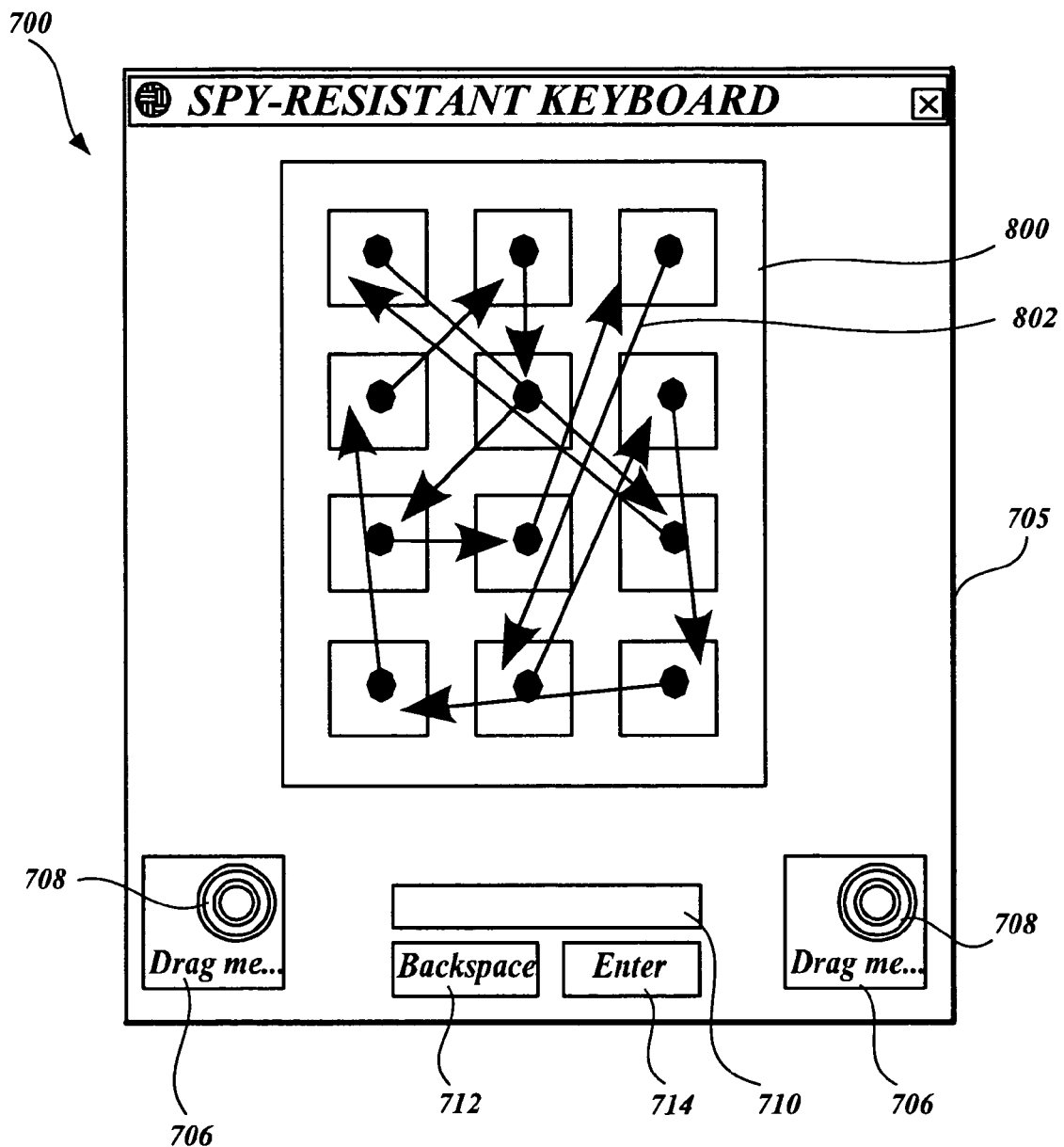
FIG. 8 illustrates a graphical representation of the spy-resistant keyboard of FIG. 7 as it undergoes the shifting of blanked tiles.

FIG. 7 is a graphical representation of the spy-resistant keyboard 700 according to another exemplary embodiment of the present invention. FIG. 8 illustrates a graphical representation of the spy-resistant keyboard 700 of FIG. 7 as it undergoes the moving of blanked tiles 800. Each of the referred to FIGS. 7 and 8 will be discussed in conjunction with various elements illustrated in relation with the system 100.

Referring to the figures, the spy-resistant keyboard 700 includes a plurality of tiles 704 displayed within a graphical window 705. In the exemplary embodiment illustrated in FIGS. 7 and 8, there are twelve (12) tiles 704, where each tile includes either a number or a symbol. In the case of the embodiment illustrated in FIGS. 7 and 8, the tiles 704 include the numbers 0-9 and the characters "*" and "#". The moving function of the graphical spy-resistant keyboard 700 is handled by the spy-resistant keyboard routine 126.

The spy-resistant keyboard 700 illustrated in FIGS. 7 and 8 also includes two Interactor tiles 706, which are illustrated in the figures as having the label "drag me . . . " In addition, the Interactor tiles 706 each include a draggable element 708. The spy-resistant keyboard 700 also includes a text field 710, a Backspace key 712, and an Enter key 714.

Regarding the spy-resistant keyboard 700 representations illustrated in FIGS. 7 and 8, FIG. 7 illustrates a rendering of the spy-resistant keyboard 700 before a user has interacted with the keyboard 700. FIG. 8 illustrates blanked tiles 800 that are undergoing a moving process. According to an exemplary embodiment of the present invention, and discussed further below, the tiles 704 are blanked once a user begins the process of dragging one of the draggable elements 708. At the same time, the blanked tiles 800 are shifted, as represented by arrows 802, to another tile position once the draggable element 708 is interfaced with by the user. Even though arrows 802 indicate that the tiles 704 move in straight lines to their new locations, the tiles may also move to their new locations in less direct routes. Similar to the moving of the tiles 704, the spy-resistant keyboard routine 126 performs the rendering of the blank tiles 800.

Use of Spy-Resistant Keyboard—Second Embodiment

Figure 9:
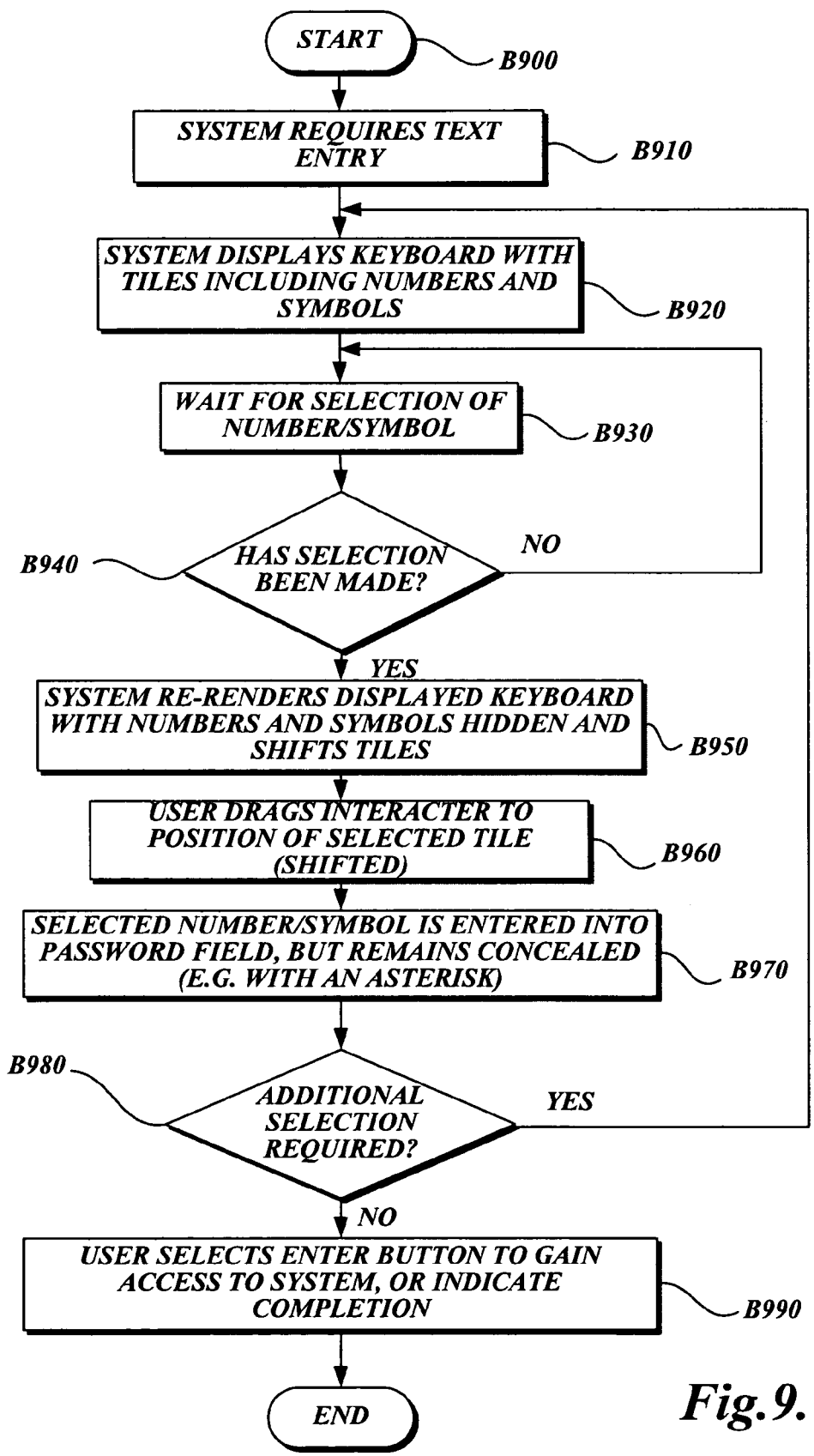
FIG. 9 is a flowchart illustrating a process for entering a password/pass code using a spy-resistant keyboard in accordance with another exemplary embodiment of the present invention.

FIG. 9 is a flowchart illustrating a process for entering a password/pass code using the graphical spy-resistant keyboard 700 in accordance with another exemplary embodiment of the present invention. Block B600 represents the start of the process illustrated in FIG. 9. As previously discussed, upon initialization of the operating system 120, the system 100 may require entry of a password/pass code to gain access to and operate the operating system 120 (B910). If this is the case, the system 100, in conjunction with the operating system 120, will display the spy-resistant keyboard 700 with tiles 704 including numbers or symbols (B920).

Once the spy-resistant keyboard 700 is displayed on the display screen 110, the system 100 waits for a user to select a number or symbol from one of the tiles 704 (B930). In order to select a number or symbol of one of the tiles 704, the user simply views the window 705 of the spy-resistant keyboard 700 in order to determine the location of a desired number or symbol. Once the number or symbol is visually located, for example, the number three (3), the user touches one of the draggable elements 708 and begins to drag the draggable element 708. When the user begins dragging the draggable element 708, the system blanks the tiles 704 and moves the tiles 704 (B950). As is illustrated in FIG. 8, the blanked tile '3' is moved to the position the blanked tile '0' was located. The user should visually follow the selected tile as it shifts to a new position. Furthermore, as is illustrated in FIG. 8, the other tiles 704 are also moved.

In order to actually select the chosen number or symbol, the user must wait for the moving tiles to arrive at their new locations and then drag the draggable element 708 to the new location of the moved tile 704 in which the chosen number resides (B960). As the user drags the draggable element 708 across the window 705 of the spy-resistant keyboard 700, the tiles 704 remain blank. In order to register the selection of the chosen number or symbol in the system 100, the draggable element 708 must be placed over the tile 704 that contains the chosen number or symbol. Once the draggable element 708 is positioned over chosen tile 704, the user then drops the draggable element 708. The selected number or symbol under the draggable element is entered into the text field 710 (B970). In one embodiment, the entered character may be hidden by another character or symbol so that an unauthorized observer cannot see the chosen number or symbol. For example, chosen numbers or symbols may be represented in the text field 710 as asterisks ('*'). If the user forgets which tile 704 includes the chosen number or symbol, the user may simply drop the draggable element 708 at a location where a tile 704 is not located and nothing will be entered into the text field 710. If this occurs, a new instantiation of the spy-resistant keyboard 700 is rendered (see block B980). If the user would like to delete a character that has been entered, the user may select the Backspace key 712.

Once a character is entered into the text field 710, the user has the option of entering additional numbers and/or symbols using the spy-resistant keyboard 700 (B980). In particular, the user may use the spy-resistant keyboard 700 to enter additional numbers and/or symbols, as discussed in relation to Blocks B920-B980. However, if the user has finished entering text in the text field 710, then the user may select the Enter key 714 to gain permissible access to the system 100, assuming correct entry of a password/pass code registered in password subroutine 128 stored in the nonvolatile storage 118 (B990).

Alternatives

The spy-resistant keyboards 106 and 700 may be used to enter text other than passwords and/or pass codes. For example, if desired the spy-resistant keyboards 106 700 may be used as the primary input device for the computer system 100. Moreover, the spy-resistant keyboards 106 and 700 may be used in conjunction with other input devices used with the computer system 100. For instance, the computer system 100 may use a conventional hardware keyboard (auxiliary input device 104) for text entry, but require use of one of the spy-resistant keyboards 106 and 700 when password and/or pass code input is necessary. This is also true if the computer system 100 uses a conventional soft keyboard.

The spy-resistant keyboards 106 and 700 may be implemented using software code, which is processed by the processor 102 of the computer system 102. Any software programming language may be used to implement the spy-resistant keyboards 106 and 700. Alternatively, the spy-resistant keyboards 106 and 700 may be preprogrammed as part of an integrated circuit having internal processing capability.

The spy-resistant keyboards 106 and 700 are described and illustrated as having certain layouts. However, the illustrated spy-resistant keyboards 106 and 700 are merely exemplary of the present invention. In particular, the spy-resistant keyboard 106 may have various operational layouts depending on the system 100 for which it is intended. For example, an automatic teller machine may not need 42 character tiles 200 to allow for sufficient password and/or pass code entry. Thus, the spy-resistant keyboard 106 may be implemented with greater than or less than 42 character tiles 200, and therefore varying numbers of included lowercase and uppercase letters and/or other characters, as necessitated by the system 100 requirements. The described alternatives related to the spy-resistant keyboard 106 are also true for the spy-resistant keyboard 700.

Similarly, the general aesthetics of the spy-resistant keyboards 106 and 700 may be modified. For instance, more than or less than two (2) Interactor tiles (250, 706) may be used, or instead of the underliner 200, the characters of the character tiles 200 may also be highlighted when one of the Interactor tiles 250 is interfaced to cause a shifting action of the spy-resistant keyboard 106.

The spy-resistant keyboard 106 may use character tiles 200 that include only one character in each of the character tiles 200. In this exemplary embodiment, the underliner 200 is not necessary, and a user of the keyboard merely views the character tiles 200, makes a mental selection of the character tile 200 with the desired letter, symbol, or general character, and then drags the draggable element 260 to the selected character tile 200 in order to select the chosen letter, symbol, or character. All of the character tiles 200 are still blanked as the draggable element 260 is dragged to the position of the chosen letter, symbol, or character.

While the exemplary embodiments of the invention have been illustrated and described, it will be appreciated that various changes can be made therein without departing from the spirit and scope of the present invention.

The embodiments of the invention in which an exclusive property or privilege is claimed are defined as follows:

1. A method for making a soft keyboard of a computing device spy-resistant, comprising:
   (a) displaying a plurality of user-selectable characters within a plurality of character tiles, the plurality of character tiles forming the soft keyboard;
   (b) transforming the plurality of character tiles into a plurality of blanked character tiles by simultaneously causing the plurality of user-selectable characters within the plurality of character tiles to disappear;
   (c) causing the plurality of blanked character tiles to visually shift position;
   (d) detecting the selection of one of the plurality of blanked character tiles by a user; and
   (e) repeating (a) through (d).

2. The method according to claim 1, wherein each character tile includes one user-selectable character.

3. The method according to claim 1, further comprising detecting movement of a character selector, the movement of the character selector causing the plurality of user-selectable characters within the plurality of character tiles to disappear and further causing the plurality of blanked character tiles to shift position.

4. The method according to claim 3, wherein each character tile includes only one user-selectable character.

5. The method according to claim 4, wherein the user-selectable characters are numbers.

6. The method according to claim 1, wherein the plurality of blanked character tiles shift position in a random manner.

7. The method according to claim 1, further comprising entering the blanked user-selectable character from the selected one of the plurality of blanked character tiles into a field, the user-selectable character being concealed by a predetermined character.

8. The method according to claim 7, further comprising displaying a plurality of user-selectable characters within a plurality of character tiles once the selected one of the plurality of blanked character tiles is entered into the field.

9. An article of manufacture for use in programming a processor, the article of manufacture comprising at least one computer readable storage device including at least one computer program embedded therein that causes a processor to perform the method of any of claims 1, 3, 7, or 8.

10. A system, comprising:
   (a) a display; and
   (b) a processor for causing:
      (i) a plurality of user-selectable characters within a plurality of character tiles to be displayed on the display;
      (ii) the plurality of user-selectable characters within the plurality of character tiles to simultaneously disappear before a character tile of the plurality of character tiles is selected by a user;
      (iii) the plurality of character tiles to shift position;
      (iv) the selection of one of the plurality of character tiles by a user to be detected; and
      (v) repeating (i) through (iv).

11. The system according to claim 10, wherein the display is a touch sensitive display interactable via physical touch by a user thereof.

* * * * *